A. Derrom.

Portable House.

No. 1,741.

Reissued Aug. 23, 1864.

Witnesses:
Thomas Sutton
Edwin S. Arnold

Inventor:
Andrew Derrom
Mason, Fenwick & Lawrence
Attys

UNITED STATES PATENT OFFICE.

ANDREW DERROM, OF PATERSON, NEW JERSEY.

IMPROVEMENT IN PORTABLE HUTS.

Specification forming part of Letters Patent No. 32,757, dated July 9, 1861; Reissue No. 1,741, dated August 23, 1864.

DIVISION No. 1.

*To all whom it may concern:*

Be it known that I, ANDREW DERROM, of Paterson, in the county of Passaic and State of New Jersey, have invented a new and useful Improvement in Constructing Houses; and I do hereby declare that the following is a full, clear, and exact description of the same, reference being had to the accompanying drawings, forming part of this specification, in which—

Figure 1:
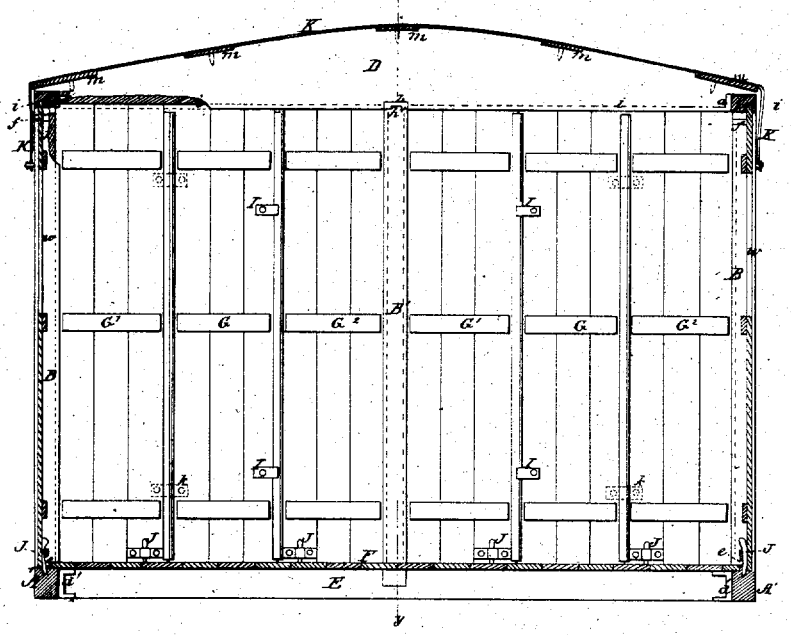
Figure 2:
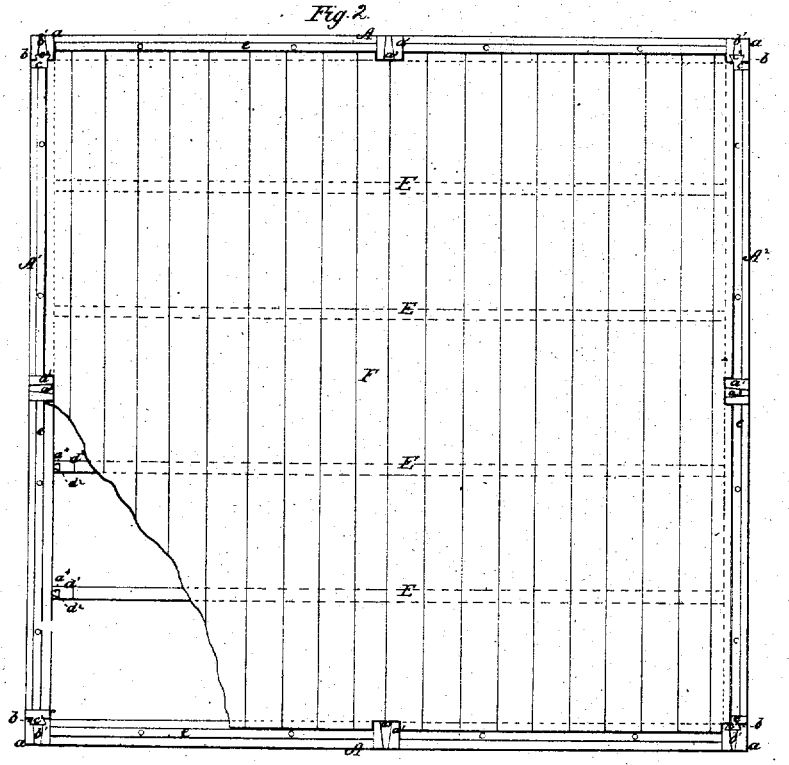
Figure 3:
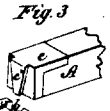
Figure 4:
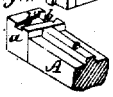
Figure 5:
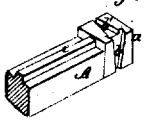

Figure 1 is a vertical transverse section of a house erected in accordance with my invention; Fig. 2, a horizontal plan of the sills of the house; Figs. 3, 4, and 5, detail perspective views; Fig. 6, Sheet 2, a vertical longitudinal section of the house shown in Fig. 1; Fig. 7, a horizontal section in the line *x x* of Fig. 6, and Fig. 8 a perspective view of one of the sections of siding.

The same letters of reference in the several figures indicate corresponding parts.

The framing of a quadrilateral house, such as shown in the drawings, consists of four sills, A A A′ A′, eight vertical studs, B B B B B′ B′ B′ B′, two upper girders or ties, C C, four rafters, D D D D, and four joists, E E E E. The number of parts, however, may be varied accordingly, as circumstances may require.

Two of the sills, those A A, have attached on each of their ends an angular casting, *a*, on the inner side, and top of which is cast an angular slot, *b b′*, of dovetail form, both in a transverse and longitudinal direction. On each of the ends of the other two sills is attached a casting, *c*, with a dovetail projection, *c′*, combining the bevel and taper principles of fastening, formed on its face. By means of the part *b* of the angular slot of the casting *a* and the dovetail projections *c′* of the castings the sills A A A′ A′ are fastened together, the smallest end of the dovetail projections passing downward into the part *b* of the slots, and thus more effectually retaining their hold by reason of the weight of the structure erected upon the sills.

Midway of and on top of each of the sills is attached an additional plate, *a′*, with slots $a^3$ of dovetail form, combining the bevel and taper fastening principles. There are also attached on the inner side of each of said sills castings $a^2$, with dovetail projections $a^4$, which combine the taper and bevel fastening principle. The sills also have each a narrow central bead or rib, *e*, projecting up from their top, said bead or rib extending from end to end of each sill, and by their combination inclose the square of the house.

To the sills thus constructed and united the joists E E are attached by means of castings *d′*, which are attached to each end of each joist and have formed in them dovetail slots $d^2$ combining the taper and bevel fastening principles. In this instance the smallest end of the dovetail projections are set upward so that the weight which comes upon them shall tend to cause the dovetails to more effectually maintain the connection between the joists and the sills. On the sills the flooring F, made of sections of uniform size, is laid so that the ends of the sections abut snugly against the inner side of the beads or ribs *e e e e*.

In the dovetail slots of the castings *a a′* the studs B B′ are set. Said studs having both at their upper and lower ends castings *f f′* with dovetail projections *g g′* formed on them, said projections combining the taper and bevel principles of fastening, and are forced into the part *b′* of the dovetail slots from the inside of the square inclosed by the sills, and thus when the other parts hereinafter mentioned are set up the thrust of the same will serve to lock the dovetail fastenings and prevent a separation or loosening of the joints.

The girders or upper ties, C, are channeled or grooved on their under side, as shown at *i i*, and are arranged on top of the studs B, (which are also grooved on two of their sides, as shown at *j j*,) and attached to the dovetail projections thereon by means of castings similar to those shown in Fig. 5, while the rafters D D are attached to the intermediate studs, B′ B′, (which also are grooved on two of their sides, as shown at *j′ j′*,) by means of dovetail fastenings *h h′*, similar in form to those used in fastening the joists. The dovetail fastenings both of the girders and rafters are in this instance also so disposed that the weight and thrust of the parts tend to tighten the joints.

The side and end boarding, G′ G′ $G^2$, of the house is made up of planking (or frames filled in with canvas, metal, or other substance) in sections of uniform size, and on each of the edges, on the outer side, of one of the sections of a series a batten, H, is attached, and on this battened section, on the inner side, turn-buttons I are attached, the other sections having vertical bolts J J attached to their inner side near their lower edge. The sections thus made up are applied between the studs in triplets, or quadruples, or quintuples, &c., one or more triplets, or three or more sections, being placed between each pair of studs, the sections G′ G² being placed on opposite sides of a space and the section G within said space. In applying the sections G′ G² their upper ends must be first forced up into the channel *i*, in the under side of the girders, and their lower ends pressed inward against the bead or rib *e* of the sills, and then the sections must be slid laterally upon the sills until one their edges fits snugly in the channels *j* in the studs. Now the bolts J J must be forced down into the holes formed in the sills. After this the battened sections are applied between the bolted sections by first inserting their upper ends into the channel *i* and forcing their lower ends against the bead or rib *e* and then turning the buttons across the joints formed between the sections. The battens of the sections G close the said joints, and with the buttons, channels, bead or rib and bolts give such stiffness or firmness to the side and end boardings of the house that the use of studs between every pair of sections is unnecessary; and, further, the sections, owing to entering the channels and abutting against the posts or studs, lock the dovetailed fastenings of the framing and prevent them from becoming loose, and thus every part of the structure is retained in its proper position, and the house cannot be blown down, racked out of plumb, or disjointed under ordinary circumstances without first removing the battened and buttoned sections.

To constitute doors and afford greater facility for ventilation and lighting the building, one or more of the buttoned sections of each house are connected at one edge to contiguous sections by hinges *k k*, as shown, and buttoned at the other edge, a rabbet being substituted for the central part of the channel *i*, or the door is cut shorter to allow it to swing freely. Several of the bolted sections should also be constructed with spaces *w* for the reception of windows. Where the doors are hung the battens are placed on the inside of contiguous sections G′ G².

The roofing of the house is formed by nailing strips of planking *m m* across the rafters and stretching water-proof canvas K or other material over the same and tying it down by means of cords. Of course, wood, metal, or tile, or any of the ordinary roofing, made in sections of uniform size, may be used.

It will be obvious that the plan of my invention is such that the parts of single houses may be used in the erection of a series of connected houses by leaving out an end at one place and a side at another, or, in other words, the parts of several small houses may be put together so as to form a closed structure of any desired uninterrupted capacity for the accommodation of a large number of troops, or so as to form a structure on a continuous line, as illustrated by diagram Fig. 9, or around a hollow square, as illustrated by diagram Fig. 10, or on any of the other geometrical plans illustrated by the diagrams Fig. 11, 12, 13, 14, and 15. If Fig. 15 is adopted, the framing of each small house must be six-sided.

I would here remark that my plan of constructing houses will admit of any ornamental configuration being applied. Also, that if the houses are, singly, of such size as to require very heavy framings, the dovetail fastenings may be made of wood and be formed directly on the timbers, and, further, that houses of several stories may be erected on the same principle.

The advantages of my invention lie, first, in the cheapness of construction of all the parts ready for erection at a mill or factory; second, in the compactness of all the parts when boxed for transportation from one place to another; third, in the capability of the parts being used in building a series of disconnected small houses or one building of great capacity; fourth, in the ease and convenience with which any person not skilled in mechanics can put all the parts together without the use of nails or screws; fifth, in the use of nails, screws, &c., being entirely dispensed with in the erection of the houses; sixth, in the parts belonging to the distinguishing portions of the house or houses being so constructed that they match one another, and may be thrown together in a pile and used or handled indiscriminately, and besides this, in case of sudden fire, and a speedy egress is desired, or it is desired to have an open pavilion, or to change the appearance of the structure in the ease with which the side sections, without disturbing the posts or side framing, can be speedily removed by simply operating a few buttons and bolts, whereas, with other structures of anterior date to my invention it is necessary either to break out the panels or to take down a portion of the framing or posts before the sections can be disturbed; seventh, in the convenience with which the parts of a house or houses can be taken down after having been erected and re-erected in another locality; eighth, in the great rigidity of the structure or structures when erected produced by a combination of the dovetail and locking principles, as herein described.

My invention will be of great benefit as a substitute for the huts used in tropical climates. It will also meet the wants of the pioneer, who, with small means, locates himself upon our Western lands. It further will in many cases serve a better purpose than tents or the imperfect barracks used by the army, and, in fact, it will be useful generally in all parts of the country.

What I claim under this patent is—

1. The right and left battens H on the sections G in combination with the buttons I, in the manner and for the purpose herein described.

2. The angular blocks *a*, with angular dovetail slots *b b'* formed in them in the manner and for the purpose described.

3. The construction and combination of the sills A A' *e*, studs B B' *j j'*, rafters D D *i*, girders C C *i*, sliding sections G G' $G^2$ H I J, and dovetail-fastenings, in the manner and for the purposes herein described.

4. The combination of the section G with inner and outer stops, and the sections G' $G^2$ with bolts, for the purpose of forming the sides and ends of a house with intermediate posts or studs, substantially as described.

5. The application of dovetail fastenings, which lock both in a longitudinal and transverse direction, for the purpose and in the manner herein described.

ANDW. DERROM.

Witnesses:

CHAS. D. BURNETT,

GEORGE W. GREENWOOD.